Oct. 8, 1946.　　R. A. SCHAFER ET AL　　2,408,957
REMOTE CONTROL APPARATUS FOR MACHINE TOOLS
Filed Jan. 15, 1944　　15 Sheets-Sheet 1
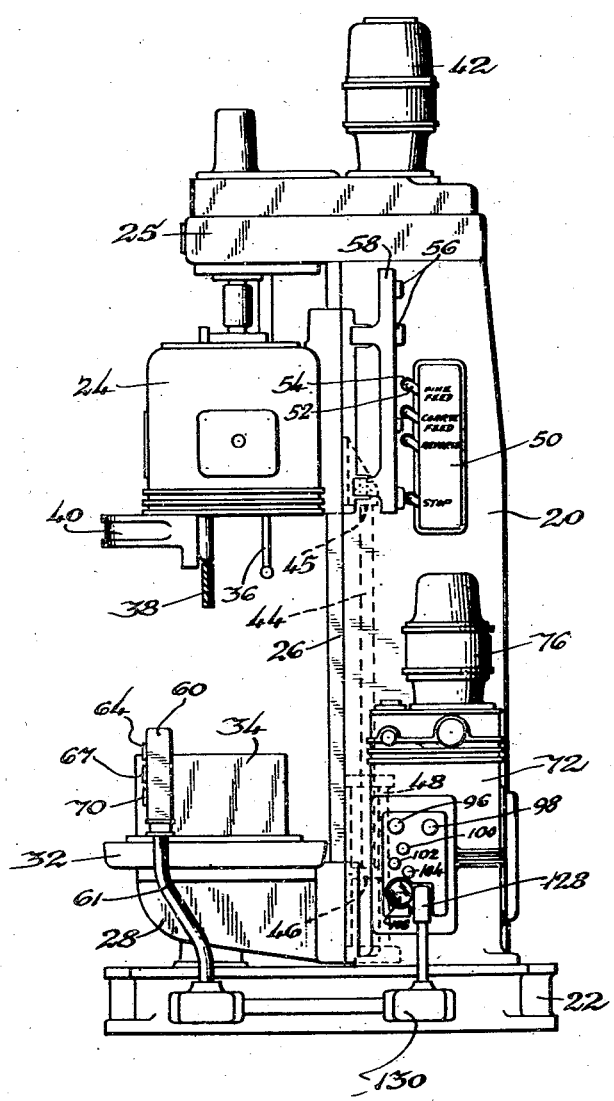

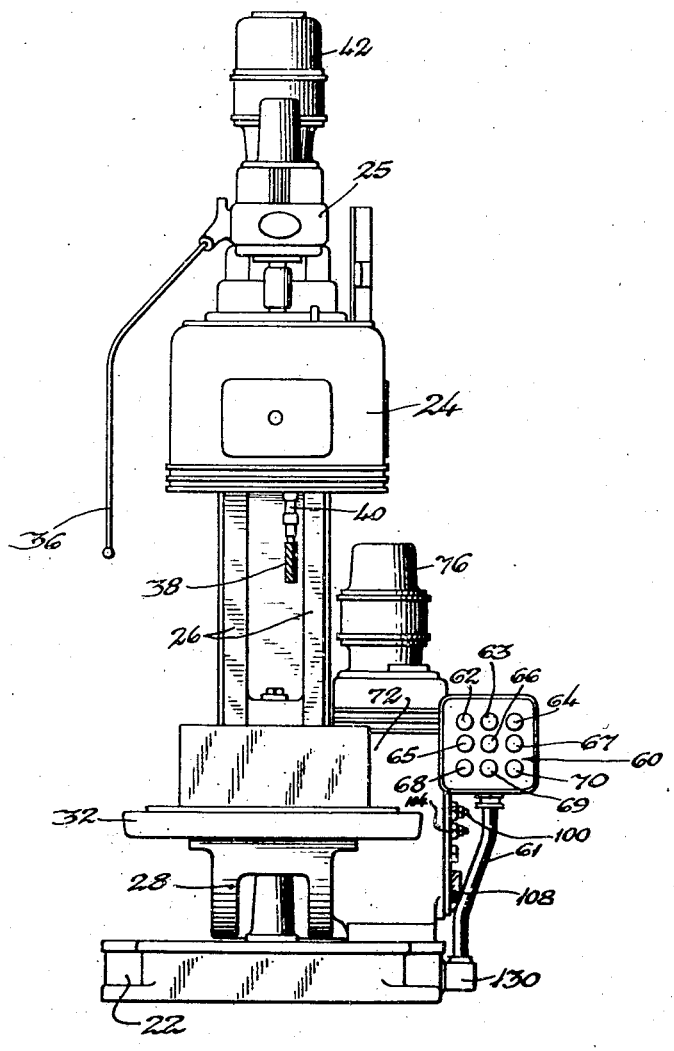

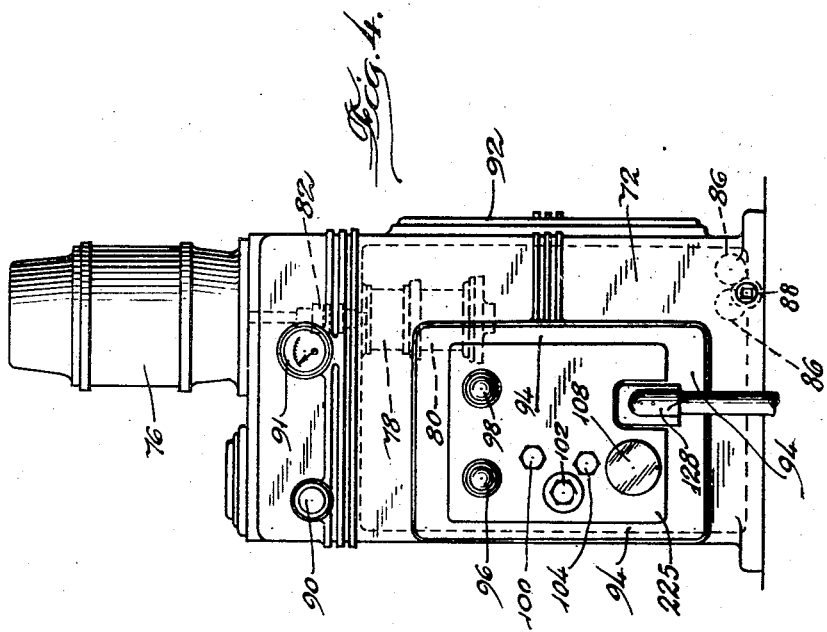
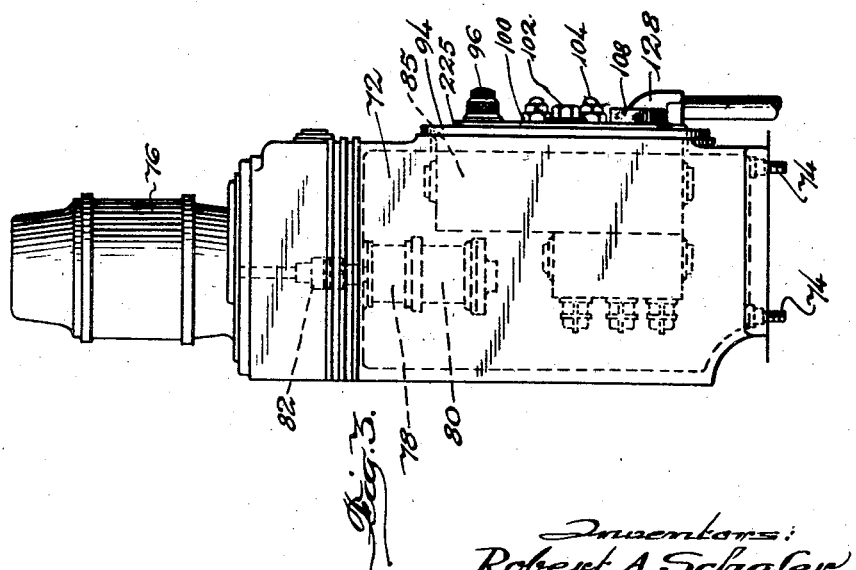

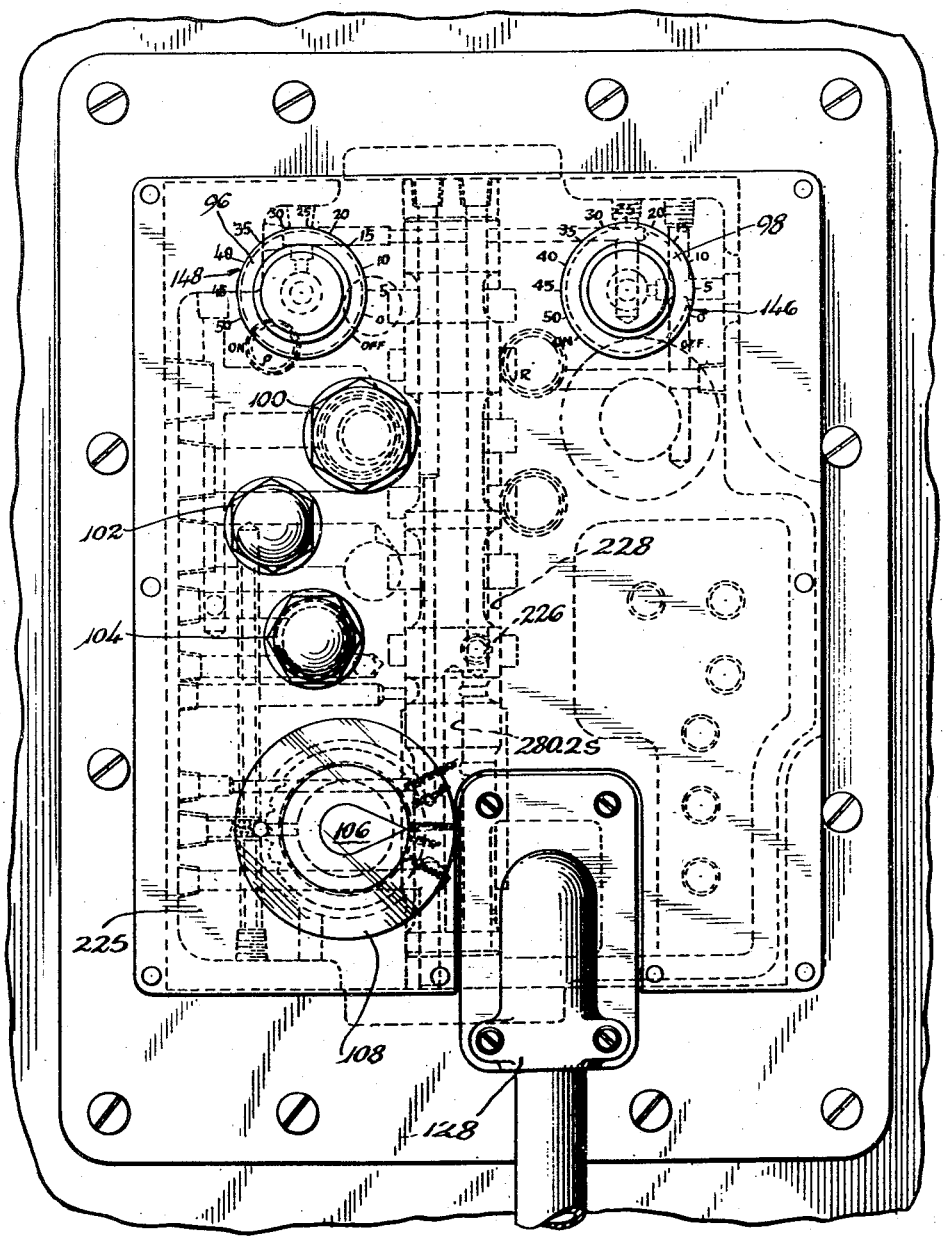

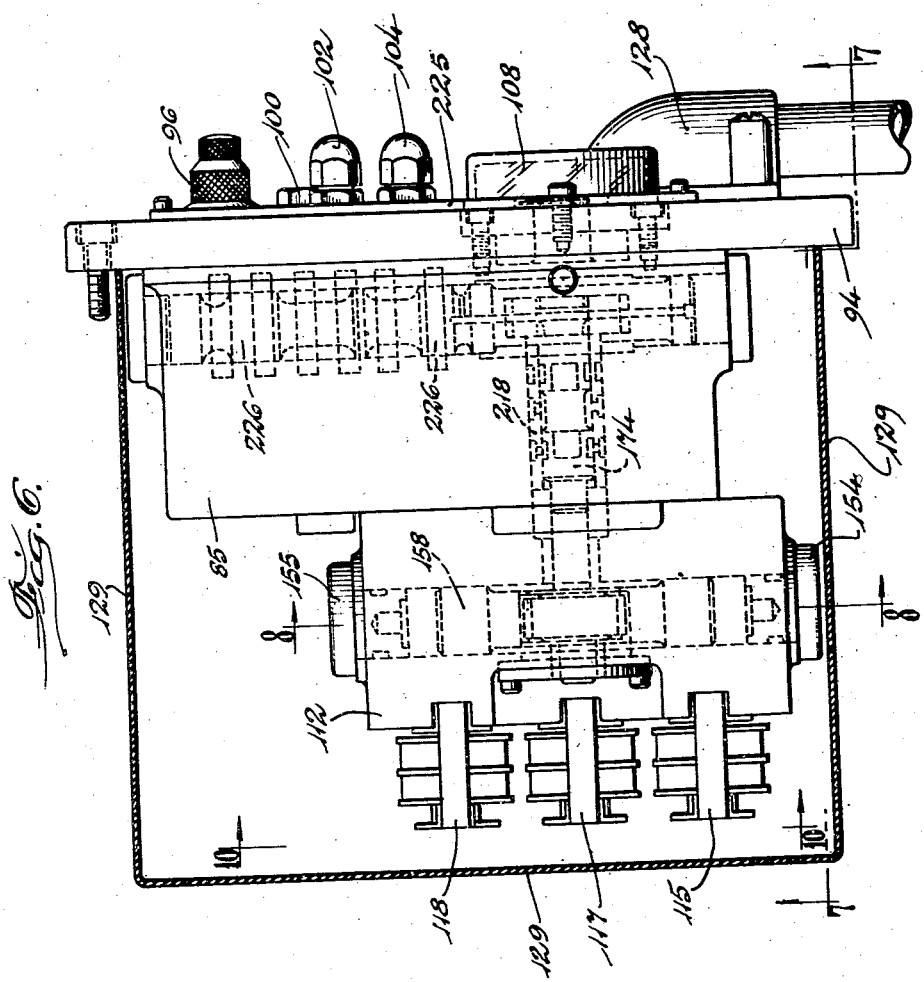

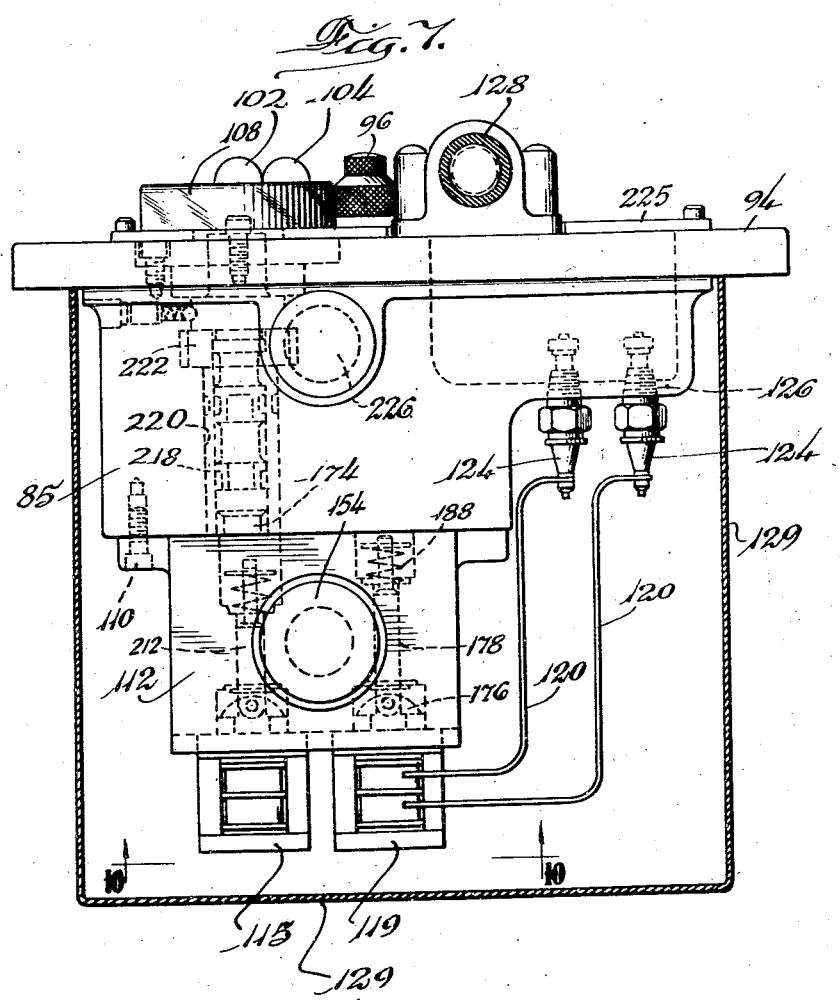

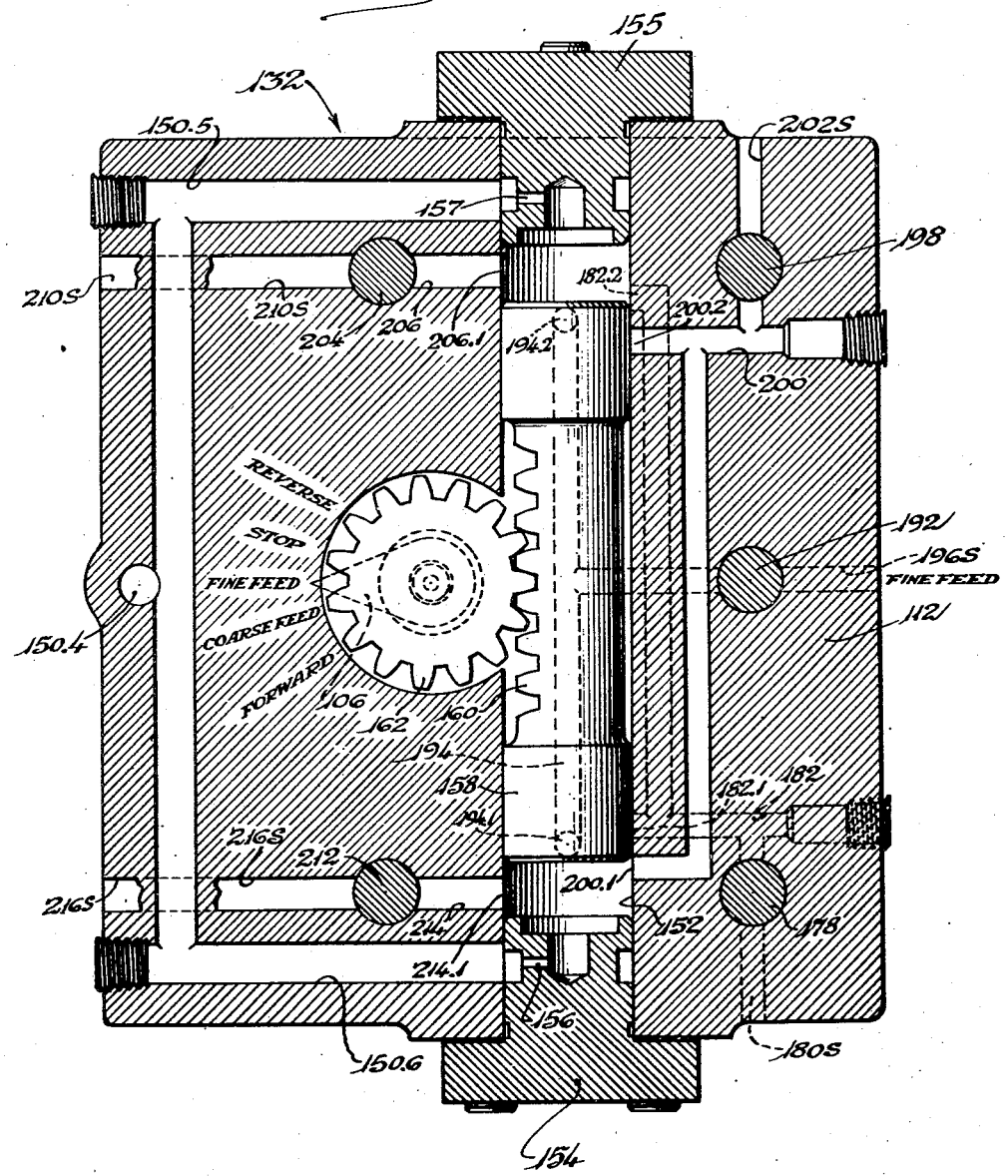

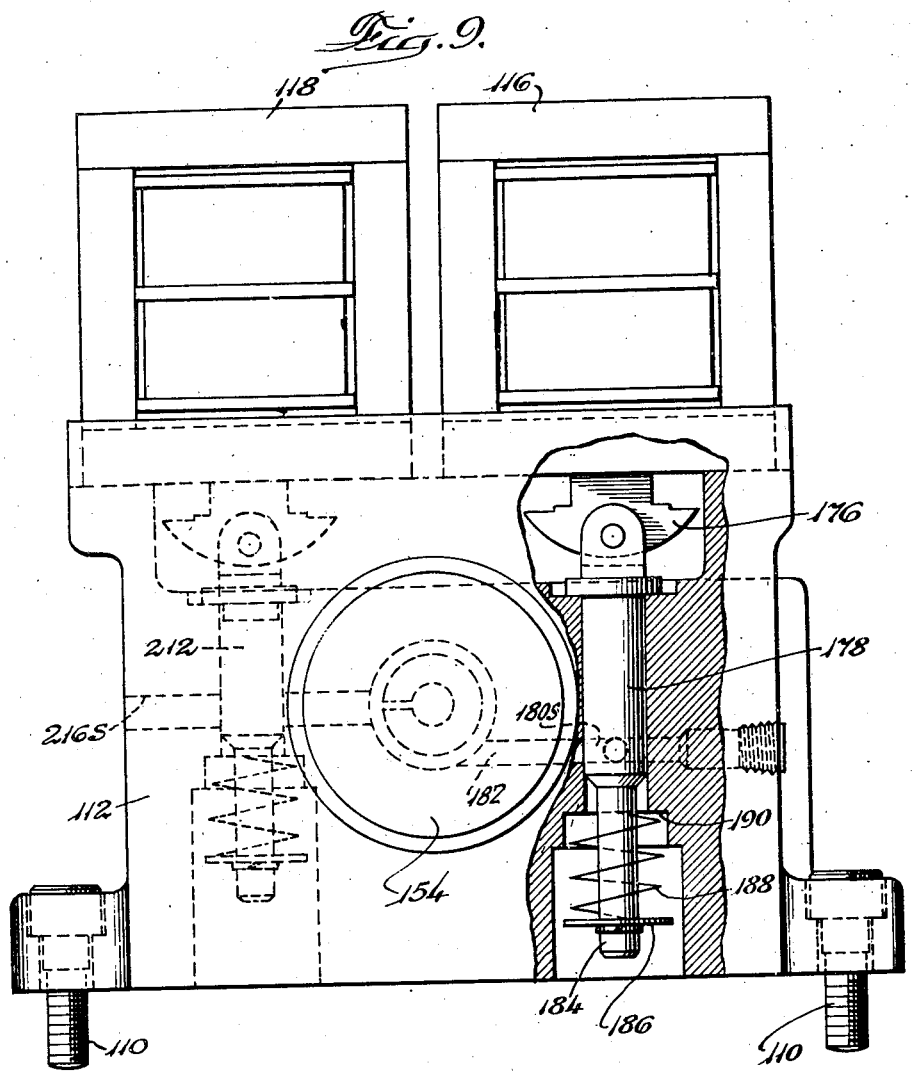

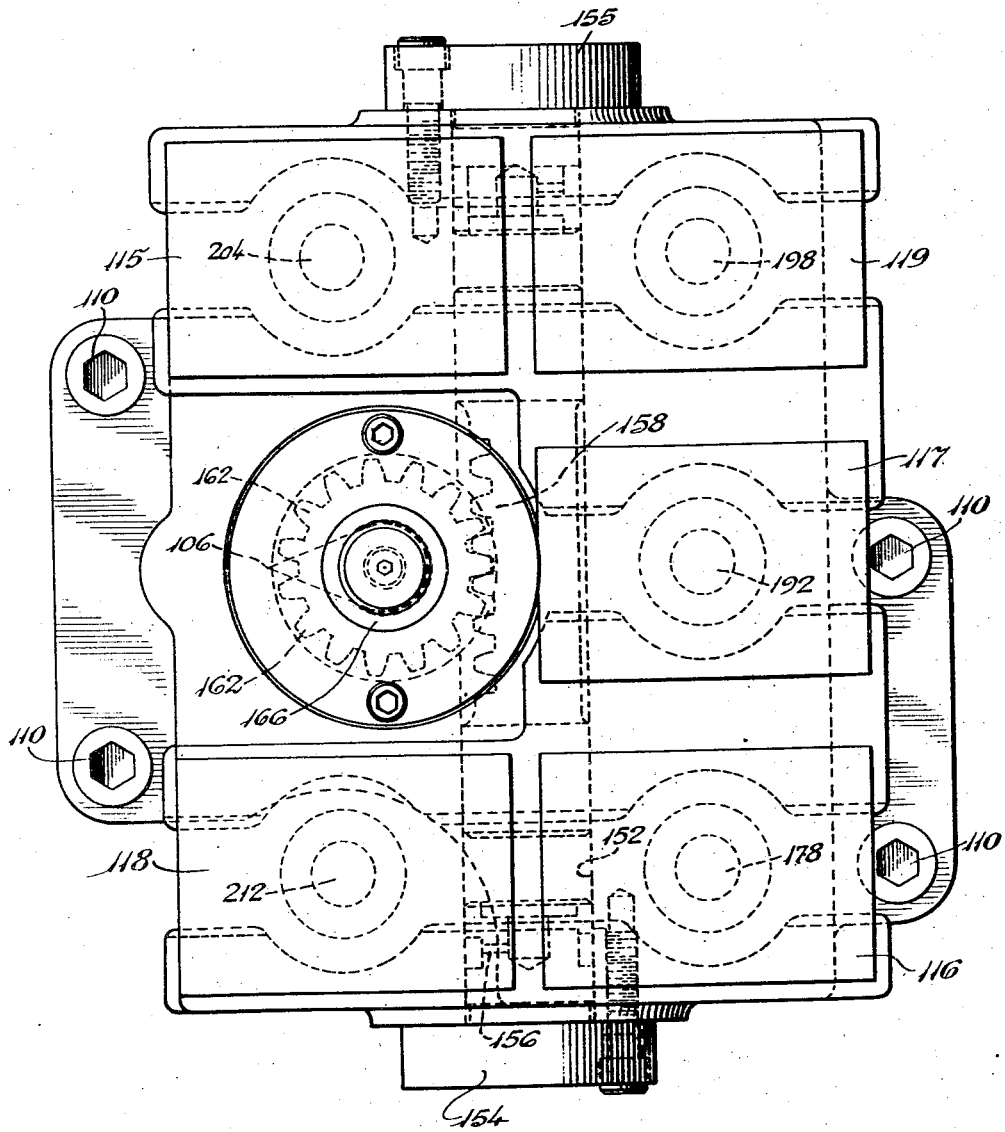

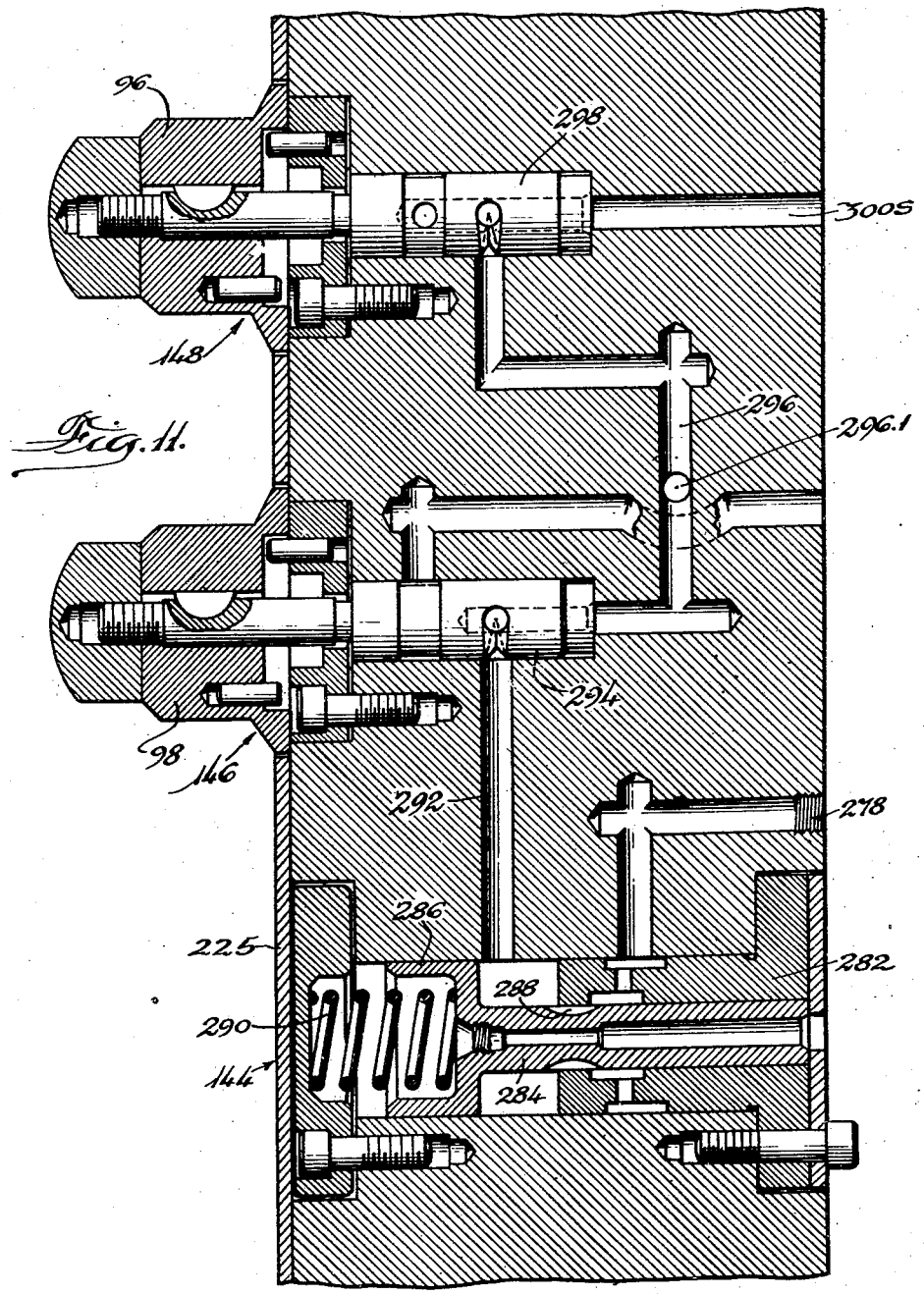

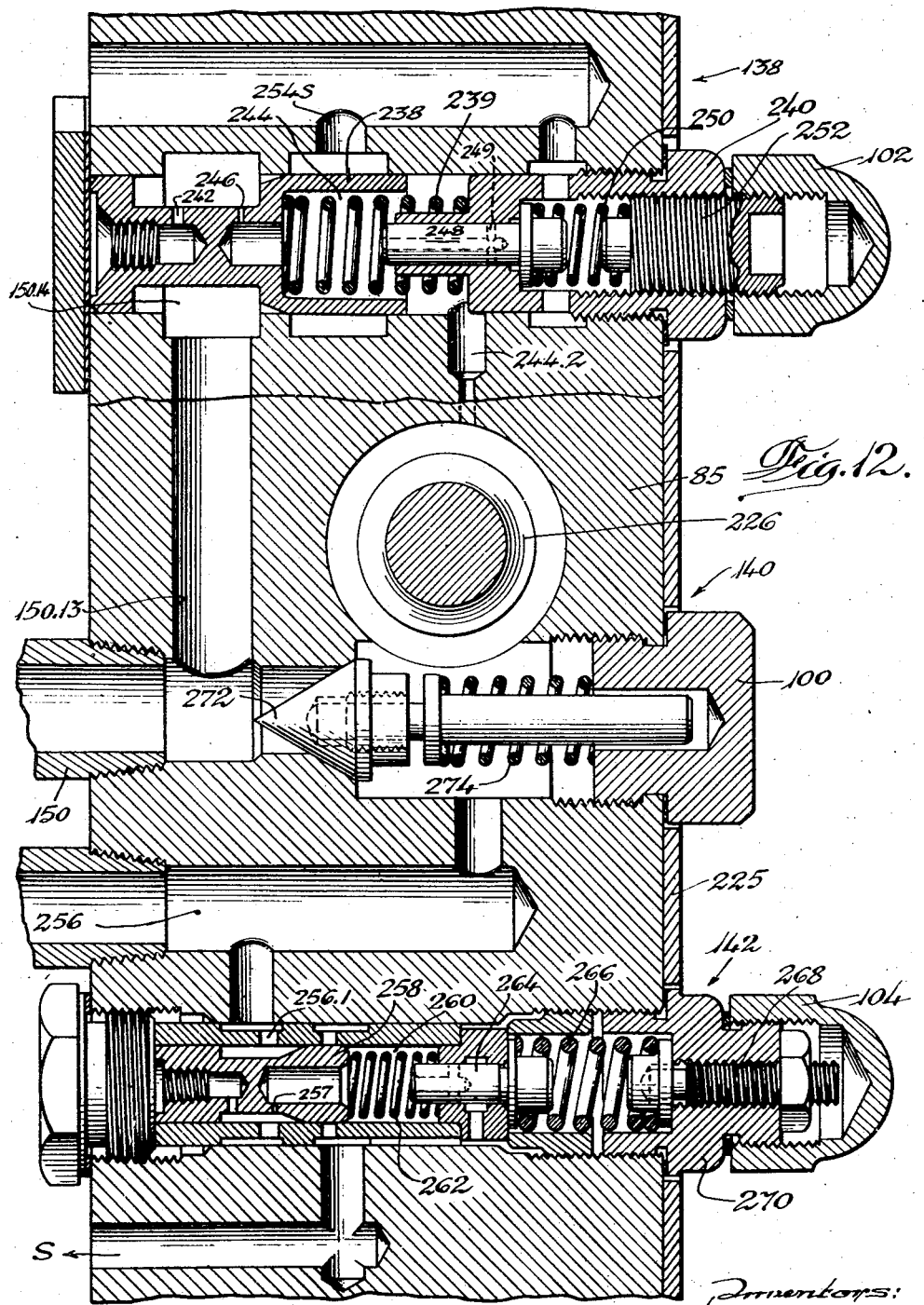

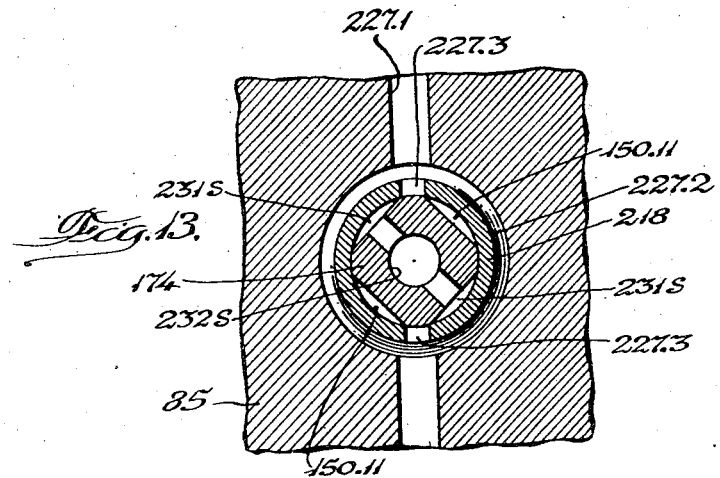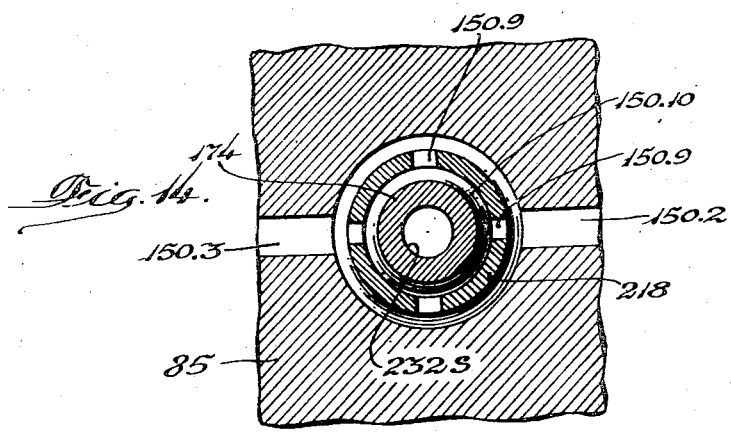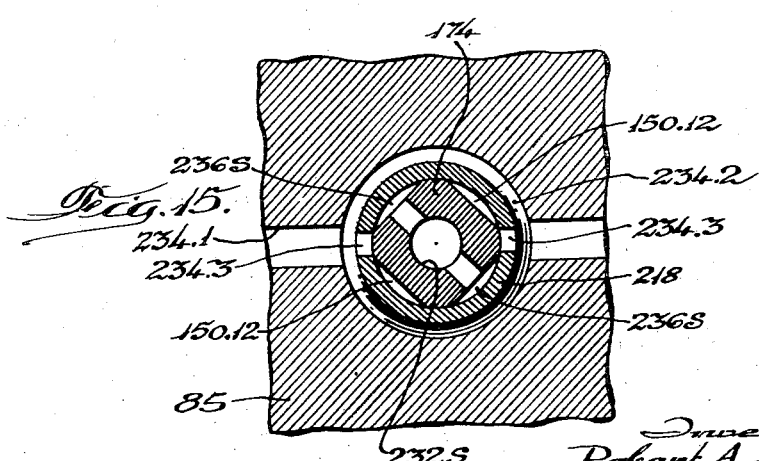

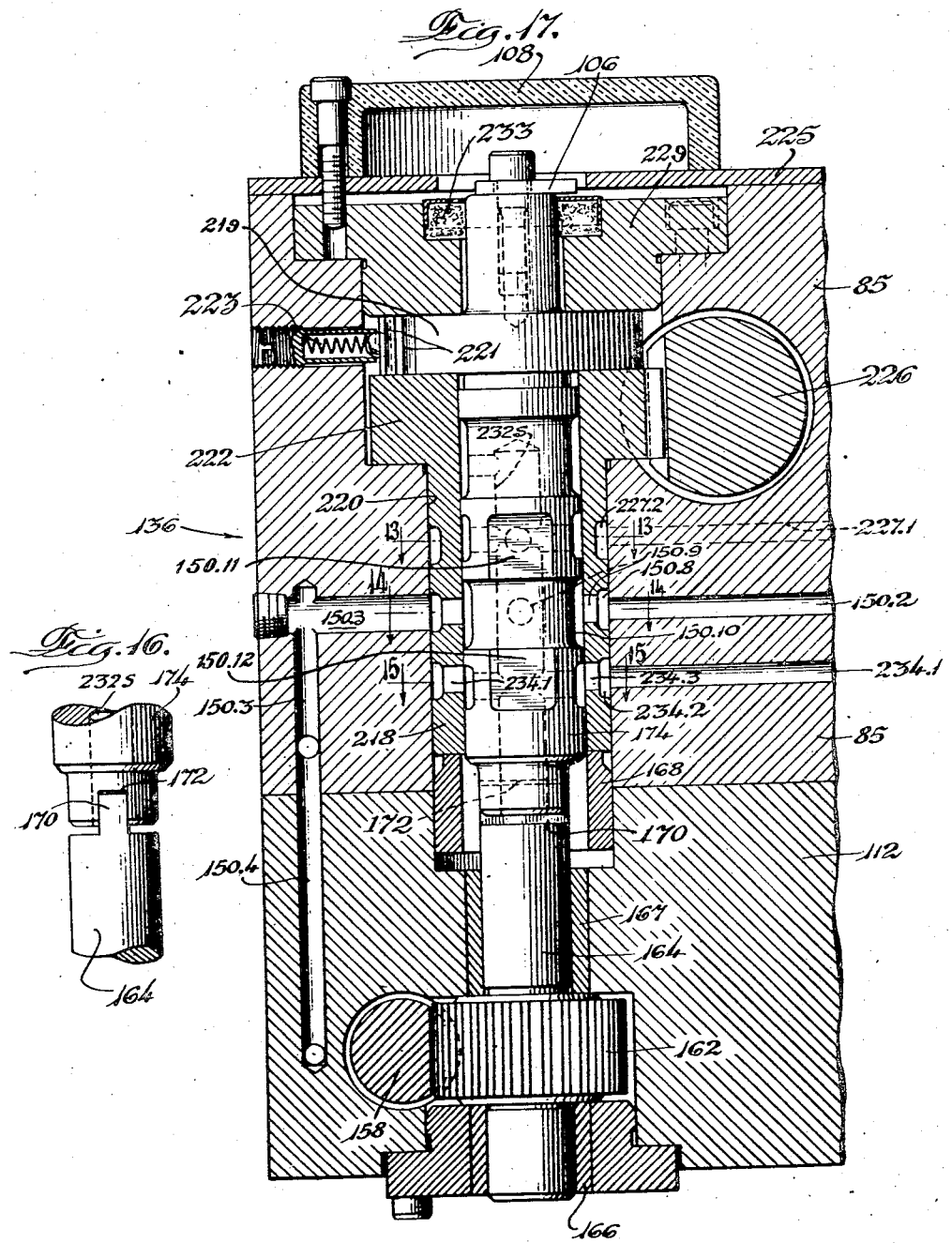

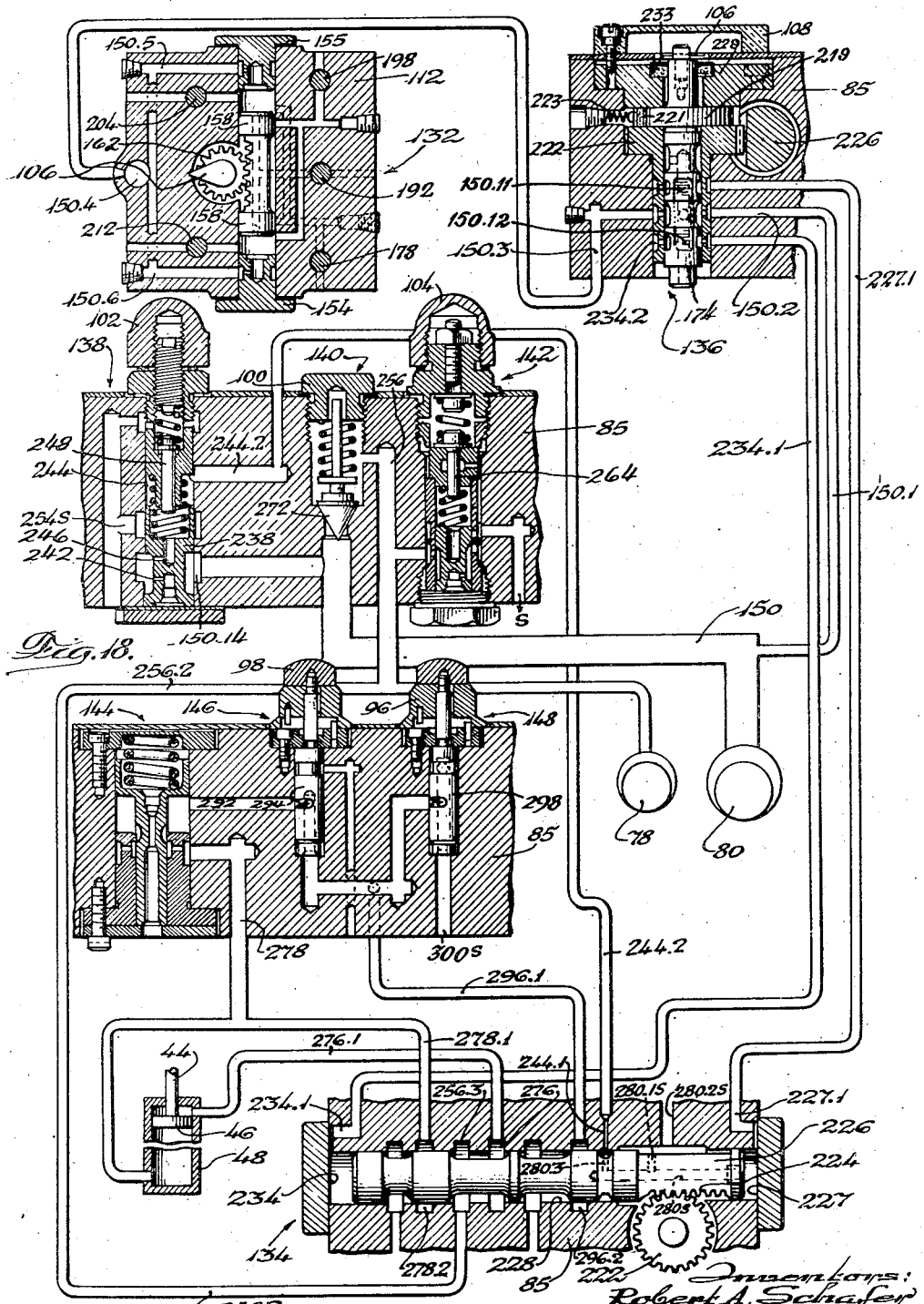

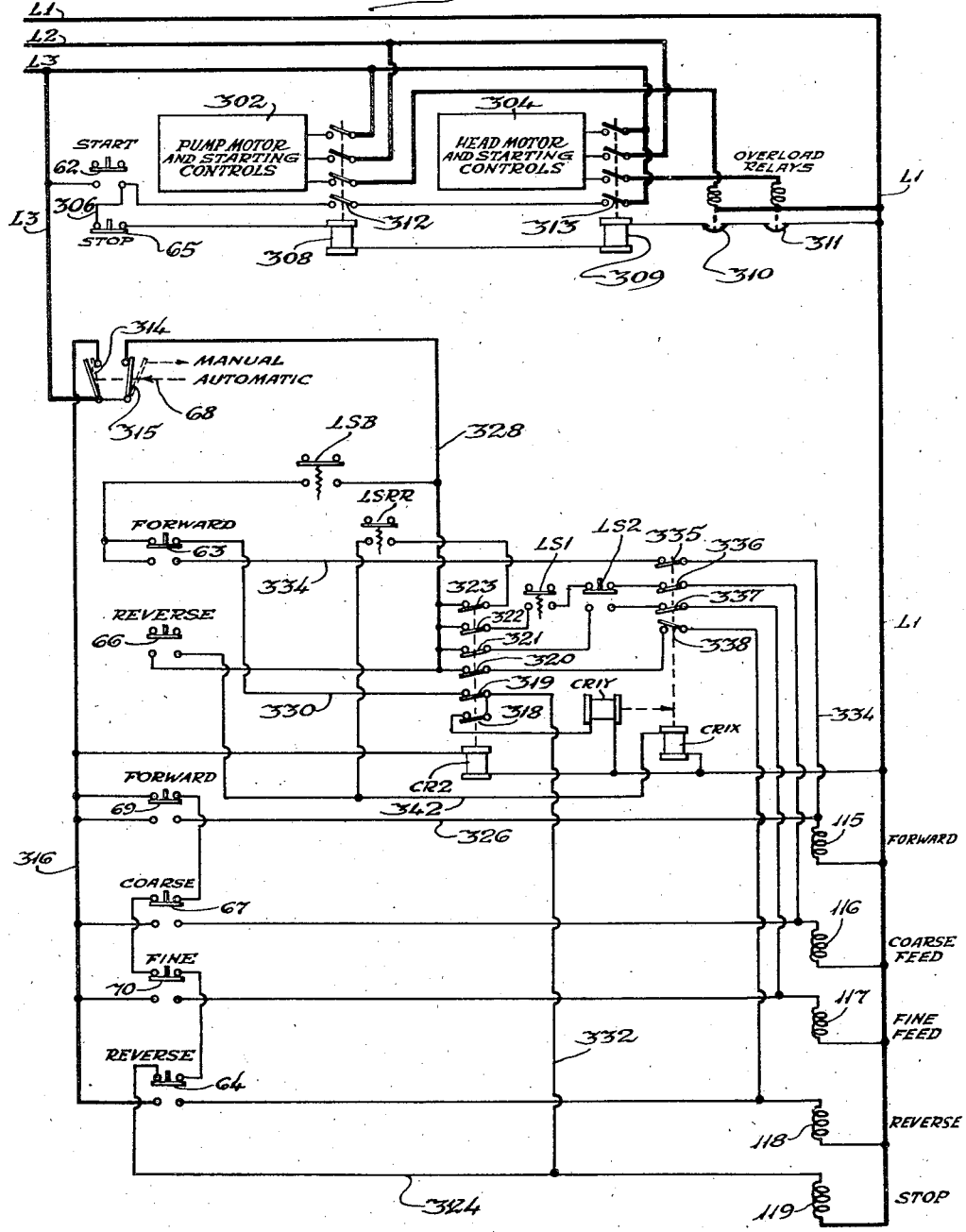

Patented Oct. 8, 1946

2,408,957

UNITED STATES PATENT OFFICE 2,408,957

REMOTE CONTROL APPARATUS FOR MACHINE TOOLS

Robert A. Schafer and Ralph B. Rodal, Richmond, Ind., assignors to National Automatic Tool Company, Inc., Richmond, Ind., a corporation of Indiana Application January 15, 1944, Serial No. 518,366

12 Claims. (Cl. 121—45)

Our invention relates generally to remote control apparatus for machine tools, and more particularly to combined electrical and hydraulic controls usable in conjunction with machine tools to cause them to operate through cycles of predetermined or selected character.

In the control of machine tool cycles by means of a directional valve which in turn controls the admission and discharge of hydraulic fluid to the actuating cylinder of the tool, it is desirable to initiate the control functions by means of electrical circuits and apparatus because of their greater flexibility, higher speed of operation, and because the control stations may be remotely positioned with respect to the hydraulic controls. However, the hydraulic controls generally comprise closely fitting valves, such as the directional valve, which require considerable power for their operation, and it is therefore not feasible, in general, to apply the necessary actuating forces to the directional valve by electrical means.

It is therefore one of the primary objects of our invention to provide an improved control apparatus for machine tools, which combines the reliability and ruggedness of the hydraulic control with the flexibility of electrical control apparatus, thereby to obtain an improved remotely controlled machine tool.

A further object is to provide an improved solenoid controlled positioning motor arranged, through a servo valve mechanism, to control the position of the directional valve.

A further object is to provide an improved electromagnetically controlled positioning motor.

A further object is to provide an improved control apparatus for machine tools, in which the apparatus may readily be set to effect a predetermined operating cycle, or in which the apparatus may be manually controlled from a remote station.

A further object is to provide an improved combined electrical and hydraulic control apparatus which is very flexible and reliable, and which may be manually controlled from a remote station.

Other objects will appear from the following description, reference being had to the accompanying drawings, in which Fig. 1 is a side elevational view of a vertical drill press embodying the improved remote control apparatus of the invention;

Fig. 2 is a front elevational view thereof;

Fig. 3 is a front elevational view of the hydraulic reservoir, hydraulic control panel, and electric motor driven pump assembly;

Fig. 4 is a side elevational view of the assembly shown in Fig. 3;

Fig. 5 is an enlarged side elevational view of the hydraulic control panel;

Fig. 6 is a side elevational view of the hydraulic control panel assembly;

Fig. 7 is a bottom plan view of the hydraulic control panel assembly, taken on the line 7—7 of Fig. 6;

Fig. 8 is a sectional view, in part diagrammatic, taken through the axis of the positioning motor, substantially on the line 8—8 of Fig. 6;

Fig. 9 is an enlarged plan view of the positioning motor assembly;

Fig. 10 is a side elevational view of the positioning motor assembly, as viewed along the line 10—10 of Fig. 7;

Fig. 11 is a sectional view, in part schematic, through the control panel, showing the governor and the adjustable aperture coarse and fine feed valves;

Fig. 12 is a sectional view through the control panel, showing the low pressure and high pressure relief valves, and the low to high pressure oil transfer check valve;

Figs. 13, 14, and 15 are sectional views through the servo valve, taken on the lines 13—13, 14—14, and 15—15, respectively, of Fig. 17;

Fig. 16 is a fragmentary detail showing the connection between the positioning valve gear shaft and the servo valve;

Fig. 17 is a sectional view through the control panel, taken through the center of the servo valve mechanism;

Fig. 18 is a schematic diagram showing the relationship between the various portions of the hydraulic control system; and Fig. 19 is a schematic wiring diagram of the electrical control circuits.

General description

Our invention is illustrated as applied to a hydraulically operated vertical drill press which, as shown in Figs. 1 and 2, comprises a vertical column 20 suitably secured to a base 22, which, as is customary, is bolted to the floor or foundation. A suitably counterbalanced tool carrying head 24 is traversable on ways 26 integral with the column 20. An adjustable knee 28 comprises a work table 32 upon which a work piece 34 may be secured in the usual manner. Above the head 24 is a casing 25 for suitable change speed gearing which may be adjusted by a control arm 36. One or more tool carrying spindles 38 are secured to the head 24 by one or more adjustable arms 40. The spindles are rotated by an electric motor 42 having a suitable driving connection with the spindles 38 through the change speed gearing and through gearing and universal joint connections contained within the head 24.

An actuating piston rod 44 has its upper end secured to the head 24 by a bracket 45 and has a piston 46 at its lower end, this piston being reciprocable in a hydraulic actuating cylinder 48 which is rigidly secured to the inside of the column 20. A housing 50, containing limit switches, is mounted on the upper right-hand side of the column 20. These limit switches are provided with operating arms 52 carrying rollers 54 cooperable with dogs 56 adjustably secured to a bracket 58, the bracket being carried by the head 24. The rollers 54 of the limit switches lie in different planes, as do the dogs 56, so that each one of the limit switches may be controlled by a particular one of the dogs.

A push button station, comprising a panel 60, is suitably supported by an electrical conduit 61 which is secured to the base 22, the panel having nine push buttons 62 to 70, inclusive, located for convenient accessibility by the machine operator. The machine cycles are controlled by these push buttons and by the limit switches operated by the arms 52.

The electrical control circuits operate through an intermediate hydraulic traverse control unit contained in a reservoir 72, which is secured to the base 22 by bolts 74. This unit includes an electric motor 76 driving a high pressure low volume pump 78 and a low pressure high volume pump 80 through a flexible coupling 82, these pumps being located below the level of the oil within the reservoir 72, and having their outlets connected by suitable conduits to a valve body 85. The inlets of these pumps are connected by suitable conduits with strainers 86 located near the bottom of the reservoir or sump. The reservoir may be drained by removal of a drain plug 88.

An oil level gauge 90 and an oil pressure gauge 91 are mounted near the top of the reservoir 72. Servicing and installation of the unit is accomplished by removal of a cover 92 forming the major portion of the rear wall of the reservoir 72.

A valve panel 94 constitutes part of the valve body 85 and forms a portion of the side wall of the reservoir. Upon this panel are mounted the various control valves, conveniently accessible to the machine operator.

As shown to a larger scale in Fig. 5, these controls comprise a fine feed valve adjusting nut 96, a coarse feed valve adjusting nut 98, a check valve retaining plug 100, a low pressure relief valve adjustment cap nut 102, and a high pressure relief valve adjustment cap nut 104. A servo valve position indicator 106 is visible through a transparent plastic protection cap 108.

Secured to the valve body 85 by cap screws 110 is a positioning motor body 112 with which are assembled five solenoids 115, 116, 117, 118, and 119 (see Figs. 6, 7, 9, and 10). The solenoids 115 to 119 are energized through conductors 120 (a representative pair of which are shown in Fig. 7), which are connected to plugs 124 threaded in a wall 126 of the valve body 85, these plugs insulating the circuits from one another and from the valve body 85. Suitable conductors are connected to the outer ends of the plugs 124 and are led through a hooded electrical conduit 128 which is connected to a junction box 130 from which conductors lead to the push button panel 60 and to the other electrical parts of the machine tool. The valve bodies 85 and 112 are preferably enclosed in a perforated sheet metal housing 129 secured to the body 85.

In general, the machine cycle is controlled by the push buttons and limit switches operating upon the solenoids 115 to 119, these solenoids controlling the position taken by a positioning motor 132 (Fig. 18) and the positioning motor operating the directional valve 134 through a servo valve 136.

The output of the low pressure pump 80 is controlled by a low pressure relief valve mechanism 138 and a check valve mechanism 140, while the output of the high pressure pump 78 is controlled by a high pressure relief valve mechanism 142. The rate of traverse of the head is controlled by the metering of the oil discharged from the lower end of the actuating cylinder 48, this metering being effected through a governor valve mechanism 144, an adjustable coarse feed valve mechanism 146, and an adjustable fine feed valve mechanism 148.

The valve mechanisms 134, 136, 138, 140, 142, 144, 146, and 148 are generally similar to the corresponding mechanisms disclosed in our copending application, Serial No. 339,476, filed June 8, 1940, which has matured into Patent No. 2,377,720, to which reference may be had for most of the details of their construction and operation. As shown in Fig. 18, these valve mechanisms are connected in hydraulic circuits differing in some respects from those shown in the aforesaid application, and such differences will be hereinafter pointed out in detail.

To facilitate following the various hydraulic circuits, all passageways, conduits, ports, and the like, which are in communication with each other at all times, so that irrespective of the phase of the operating cycle oil could flow from one to another, will be given the same reference characters, followed by decimals to distinguish individual parts. Thus, for example, when it is stated that oil under pressure flows into a conduit bearing a certain reference character, it will be understood that oil in all parts bearing that reference character, followed by any decimal fraction, will be likewise under pressure. Similarly, all passageways, etc., through which oil is at all times free to discharge to the sump or reservoir, will be followed by the letter "S," which should be interpreted to mean, "from which the oil may flow freely to the sump."

Solenoid controlled positioning motor

The solenoid controlled positioning motor 132, best shown in Figs. 6, 7, 8, 10, and 18, is supplied with oil from the low pressure pump 80 through a conduit 150 (Fig. 18), a branch 150.1 of which extends through the valve body 85 by passageways 150.2 and 150.3, the passageway 150.3 being in registry with a passageway 150.4 in the positioning motor body 112. From passageway 150.4 oil may flow through either of two branch passageways 150.5 and 150.6 (Fig. 8). The passageways 150.5 and 150.6 communicate respectively with the ends of a cylinder 152, the ends of which are closed by gasketed caps 154, 155, through metering ports 156, 157 formed in these caps. Within the cylinder 152 a positioning motor piston 158 is freely reciprocable, this piston having heads at both ends thereof and having a rack 160 formed intermediate the heads. The rack 160 meshes with a pinion 162, which is non-rotatably secured to a stub shaft 164 (Fig. 17) mounted for free rotation in bearing bushings 166 and 167. The positioning motor body 112 is aligned with the valve body 85 by means of an alignment sleeve 168.

The shaft 164 is provided with a tang 170 fitting in a slot 172 formed in the lower end of a servo valve 174 (Fig. 16) so that this servo valve will be angularly positioned by the positioning motor.

The piston 158 has its position determined by the operation of solenoids 115 to 119. As best shown in Figs. 8 and 9, the "coarse feed" solenoid 116 has a plunger 176 which is suitably connected to a pilot valve 178. The pilot valve 178 normally cuts off a passageway 180S from a passageway 182 having ports 182.1 and 182.2 leading into the cylinder 152. The pilot valve 178 has a reduced diameter extension 184 to which a spring seat washer 186 is secured, a coil spring 188 being compressed between the washer 186 and a counterbored spring seat shoulder 190, thereby normally to hold the pilot valve 178 in its closed position. A similarly constructed pilot valve 192 is operable upon energization of its "fine feed" solenoid 117 to open communication between a branched passageway 194 and a passageway 196S, the passageway 194 having ports 194.1 and 194.2 opening into the cylinder 152.

A similar pilot valve 198 operated by the "stop" solenoid 119 is adapted to control the discharge from a branched passageway 200 to a discharge passageway 202S, the passageway 200 having ports 200.1 and 200.2 leading into the cylinder 152.

A pilot valve 204 is operable by the "forward" solenoid 115 to control the flow from a passageway 206, having port 206.1 leading into the cylinder 152, to a discharge passageway 210S.

A pilot valve 212, when operated by its "reverse" solenoid 118, opens communication between a passageway 214, having a port 214.1 leading into the cylinder 152, with a discharge passageway 216S.

From the foregoing, it will appear that oil under low pressure is continuously supplied through the metering ports 156, 157 to the ends of the cylinder 152, and that when any one of the pilot valves 178, 192, 198, 204, or 212, is opened, the motor piston 158 will be moved to a position such that it substantially cuts off the ports associated with the open pilot valve. For example, if the pilot valve 178 is opened, with the piston 158 in the position in which it is shown in Fig. 8, the oil entering the metering port 156 will exert a pressure on the adjacent head of the piston 158 to move the latter upwardly (Fig. 8), whereas the oil passing through the metering port 157 will discharge freely through the port 182.2 and passageways 182 and 180S to the sump. However, as the piston 158 moves upwardly, it will cut off the port 182.2 and thereafter the pressure on the opposite ends of the piston 158 will equalize and hold the piston in this position.

In the event that the piston should travel upwardly beyond the position at which it cuts off both ports 182.1 and 182.2, the uncovering of port 182.1 will permit a reduction in pressure at the lower end of the cylinder 152 and therefore the piston 152 will move downwardly until the port 182.1 is again covered.

In a similar way, when the pilot valve 192 is opened, the piston 158 will be forced to the position in which it is shown in Fig. 8, covering both ports 194.1 and 194.2. When the pilot valve 198 is opened, the piston 158 will be moved to a position in which it covers both ports 200.1 and 200.2. When the pilot valve 204 is opened, the piston 158 will be moved to the upper limit of its stroke, determined by its engagement with the cap 155, while when pilot valve 212 is opened, the piston 158 will move to its lower limit of stroke determined by its engagement with the cap 154. In the somewhat diagrammatic view of Fig. 8, the various positions assumed by the pilot valve connected to gear 162 are indicated by legends cooperating with the pointer 106 shown in dotted lines.

From the foregoing, it will be clear that the servo valve 174 will assume a certain definite position, depending upon which of the solenoids 115 to 110 is energized. The electrical circuits for energizing these solenoids, as will appear hereinafter, are so arranged that only one solenoid is energized at a time.

*Servo valve mechanism*

The servo valve mechanism, as best shown in Figs. 13 to 18, comprises the servo valve 174 which operates in a complementary servo valve follower sleeve 218, the latter being rotatable in a closely fitting bore 220 formed in the valve body 85. The follower sleeve 218 has a pinion 222 formed integrally therewith meshing with a rack 224 formed on the annularly grooved piston valve 226 of the directional valve mechanism 134.

A flange 219 on the servo valve 174 has a plurality of notches 221 formed in its periphery for cooperation with a spring ball detent 223, whereby the valve is held against accidental rotation due to vibration or other minor disturbances. The indicator or pointer 106 is secured to the end of the servo valve 174 and cooperates with suitable legends on a panel face sheet 225. The servo valve is held in place by a retainer 229 having an oil seal 233.

The follower sleeve 218 has a central external groove 150.8 and communicating ports 150.9 (Figs. 14 and 17), whereby oil from the low pressure pump 80 is continuously supplied to an annular chamber 150.10. The right-hand end 227 (Fig. 18) of the bore 228 for the directional valve piston 226 is connected by passageway 227.1 with annular groove 227.2 (Fig. 17) surrounding the servo valve follower sleeve 218. As best shown in Fig. 13, the annular groove 227.2 has a pair of diametrically opposite ports 227.3 which, upon relative movement of the servo valve 174 and its follower sleeve 218, may communicate with passageways 150.11 or passageways 231S which communicate with a central bore 232S through suitable ports, depending upon the direction of relative rotation.

In a similar manner (Fig. 18), the left-hand end 234 of the directional valve cylinder 228 communicates through passageway 234.1 with annular groove 234.2. As best shown in Figs. 15 and 17, the follower sleeve 218 has a pair of ports 234.3, which upon relative movement of the sleeve and servo valve 174, are adapted to communicate either with passageways 150.12 or with spaces 236S which communicate freely with the central passageway 232S, depending upon the direction of relative rotation. Passageways 150.11 and 150.12 communicate with the annular chamber 150.10.

When the positioning motor piston 158 rotates the servo valve 174 clockwise with respect to its sleeve 218, the ports 227.3 will communicate with the space 231S, thus permitting oil to flow to the sump from the space 227 at the right-hand of the directional valve 226. At the same time, the spaces 150.12 (Fig. 15) are brought into communication with the ports 234.3 and thus oil under pressure may flow from the low pressure pump 80 through the conduits 150 and 150.1, through passageway 150.2, ports 150.9, and passageways 150.10 and 150.12, to ports 234.3, annular groove 234.2, and passageway 234.1, to the left-hand end 234 of the directional valve cylinder. The directional valve 226 is thus moved to the right (Fig. 18), but due to its driving connection provided by the rack 224 and pinion 222, the servo valve sleeve 218 is rotated clockwise only until the ports 227.3 and 234.3 are again covered by the servo valve 174. Upon counterclockwise rotation of the servo valve 174, the sleeve 218 and the directional valve 226 are constrained to follow the movement of the servo valve in a similar manner. It will thus be seen that the servo valve mechanism 136 serves as a power amplifier to cause movement of the directional valve 226 in a direction and to an extent determined by the movement of the positioning motor piston 158.

Low pressure relief valve

The discharge conduit 150 (Fig. 18) is connected to a passageway 150.13 (Fig. 12) which leads to a chamber 150.14 of the low pressure relief valve mechanism 138. This mechanism is generally similar to that disclosed in our aforesaid application, and comprises a hollow piston valve member 238 which operates against a compression coil spring 239, the upper end of which seats against a bushing 240 threaded in the body 85. The oil under pressure is admitted to the lower end surface of the valve member 238 through a port 242. This oil under pressure is also admitted to space 244 in the interior of the valve member 238 through a metering orifice 246.

The oil pressure within the space 244 is exerted upon a pilot relief valve 248 held in closed position by a compression coil spring 250, the degree of compression of which may be varied by adjustment of a set screw 252 over which the cap nut 102 is threaded. Thus, when the valve 248 is moved to open position to uncover its ports 249, the pressure within the space 244 is relieved and the piston valve member 238 can then move to the right (Fig. 12) to permit relief of the low pressure pump through a port 254S. The force exerted by the spring 239 is, however, sufficient to maintain a substantial pressure in the chamber 150.14. This is necessary since the passageway 150.4 (Fig. 8—through which oil is supplied for the operation of the positioning motor) is in direct communication with the chamber 150.14. Thus the back pressure on the outlet of the low pressure pump is at all times maintained at a sufficiently high value to assure rapid operation of the positioning motor.

High pressure relief valve and check valve

The high pressure relief valve mechanism 142 is generally similar to the low pressure relief valve mechanism, and operates in a similar manner. The discharge of the high pressure pump 78 is supplied to a passageway 256 from which it flows through ports 256.1 and a metering port 257 in a valve 258 and into a chamber 260. The valve is held in closed position by a spring 262 and the pressure in the chamber 260 is relieved by a pilot relief valve 264 held in closed position by a relatively strong compression coil spring 266, the force applied by the latter being variable by means of an adjusting screw 268 threaded in a bushing 270. The adjusting screw 268 is covered by the cap nut 104.

A check valve 272, normally held closed by a spring 274 seated against a guide plug 100, is adapted to open to permit flow of oil from the passageway 150.13, that is, from the low pressure pump, to the passageway 256 whenever the pressure in the latter passageway drops appreciably below that in the passageway 150.13, as will usually occur during the rapid forward or rapid reverse traverse portions of the operating cycle. Thus, the output of both pumps is utilized during those portions of the operating cycle which do not require high pressure in the actuating cylinder 48.

Directional valve

The directional valve 226 which has been previously referred to, controls the operating cycle of the machine by determining the flow of oil to and from the opposite ends of the actuating cylinder 48 and by rendering effective the connection of the lower end of the actuating cylinder 48 to the governor valve 144 and to the adjustable coarse feed control valve 146, the fine feed adjustable control mechanism 148, or the sump during the appropriate portions of the operating cycle of the machine.

The normal operating cycle of the machine is as follows: rapid forward (downward), coarse feed forward, fine feed forward, rapid reverse to the original starting position, and stop. In Fig. 18, the directional valve 226 is shown in fine feed position. In this position the high pressure pump 78 feeds through conduit 256.2 to annulus 256.3 which is in free communication with annulus 276, which is in direct communication with the upper end of the cylinder 48 through conduit 276.1. The piston 46 is therefore forced downwardly and the oil beneath the piston is forced through passageway 278 to the governor valve mechanism 144 and hence successively through the coarse feed valve 146 and fine feed valve 148, since the branch passageway 278.1 leading to annular groove 278.2 is blocked by a land of the directional valve 226, and because the annular groove 286.2 is similarly blocked.

The directional valve 226 is similar to that disclosed in our aforesaid application, except that it is provided with a central drilled passageway 280 which has a port 280.1S communicating with the sump through a passageway 280.2S. The outer end of the passageway 280 is plugged, while the inner end has a port 280.3 which may communicate with a port 244.1 communicating with the space 244 through a passageway 244.2. By virtue of this hydraulic connection, the pressure in the space 244 is relieved during the fine feed phase of the cycle of operation, thereby permitting the valve 238 to open under lower pressure, that is, whenever the pressure of the oil delivered by the low pressure pump 80 is sufficient to move the valve 238 against the force of its spring 239. The power required to operate the low pressure pump is thus reduced during the fine feed operation. During other portions of the operating cycle, the port 244.1 is blocked by one of the lands of the directional valve 226 so that the low pressure pump 80 operates against its normal pressure determined by the degree of compression of the spring 250 (Fig. 12).

Governor and feed valve mechanisms

The governor valve mechanism 144 shown in Figs. 11 and 18, comprises a valve sleeve 282 in which a valve member 284 having a piston head 286 is reciprocable, the valve having milled ports 288 which provide apertures of greater or lesser cross sectional area as the valve 284 is moved to the left or to the right (Fig. 11) by the oil pressure exerted upon its piston portion 286 in opposition to the force of a spring 290. After passing through the ports 288 the oil flows through a passageway 292 and thence through the valve port 294 of the adjustable coarse feed valve mechanism 146.

From this valve the oil discharges through a passageway 296 to the fine feed adjustable aperture valve 298. The position of the coarse feed aperture valve 294 is adjusted by means of the knob 98, while the position of the fine feed aperture valve 298 is adjusted by means of its knob 96, suitable graduations being marked on the sheet 225 (Fig. 5) to indicate the feed rates to which these valves are adjusted.

The oil, after flowing through the adjustable aperture of the fine feed valve aperture 298, (Fig. 11) is discharged to the sump through its central bore and passageway 300S. A passageway 296.1 connects the passageway 296 with an annulus 296.2 (Fig. 18) of the directional valve, this annulus being uncovered during the coarse feed, so that during this portion of the cycle the aperture valve 294 provides the only restriction for the escape of oil from the lower end of the actuating cylinder 48.

The operation of the governor valve mechanism 144 and the two adjustable aperture valve mechanisms 146 and 148 in conjunction with the operation of the directional valve 226, is similar to the operation of the corresponding parts disclosed in greater detail in the aforesaid copending application, Serial No. 339,476. The only substantial difference resides in the provision of the ports 280.3, 280S, and 280.1S in the directional valve 226 which connect the pilot valve chamber 244 of the low pressure relief valve to the sump during the coarse and fine feed positions. The directional valve 226 differs slightly also in that it is arranged to block the port 244.1 when the valve is in stop position.

*Electrical control circuits and operation*

It has previously been pointed out how the operation of the positioning valve, through the pilot valve mechanism, controls the position of the directional valve. If it were not for the substantial force required for shifting the directional valve, the latter could have been mechanically operated by the positioning motor. The automatic cycle, as well as the manual control of the machine tool head, is determined initially by the electrical controls and circuits shown in Fig. 19.

In Fig. 19, the solenoids 115 to 119 are represented as coils bearing corresponding reference characters. The purpose of the electrical control circuits is to cause energization of these solenoids in a predetermined sequence for the automatic cycle, and to permit individual energization of these solenoids when the motion of the head is to be manually controlled.

The pump motor and starting controls are indicated by a block 302, while the head motor and its starting controls are indicated by a block 304. Energizing current for these motors and their controls is provided through line conductors L1, L2, and L3. To start these motors for either an automatic operation or a manual operation, the start push button 62 is depressed. This operation connects line L3 with a jumper connection 306 and completes a circuit through stop push button 65, windings of relays 308 and 309, and the switches of overload relays 310 and 311, to line L1. Energization of the relay 308 connects the pump motor and starting controls 302 to lines L1, L2, and L3, the circuit to line L1 including the winding of overload relay 310. Similarly, the energization of relay 309 connects the head motor and starting controls 304 with lines L1, L2, and L3, the connection to line L1 being through the winding of overload relay 311. The energization of these relays 308 and 309, through closure of switches 312 and 313, also completes a holding circuit for these relays, this holding circuit including the stop switch 65, so that whenever the stop switch is operated, the relays 308 and 309 will be deenergized and the current supply to the pump and head motors cut off.

In setting up the machine, manual operation will ordinarily be required to enable the operator to make the adjustments of the positions of the dogs 56 to accord with the piece of work to be machined. To accomplish this, the operator shifts the manual control switch 68 from the full line to the dotted line position shown in Fig. 19, thereby closing switch 314 and opening switch 315. Closure of switch 314 connects conductor 316 to the line L3 and thereby energizes control relay CR2, the latter thereby opening switches 318 to 323. The opening of these switches effectively disables the automatic control circuits and prevents power from the manual control circuits feeding back to the automatic control circuits. The relay CR2 will remain energized as long as the switch 68 is in manual position.

When the machine is thus conditioned for manual operation, the operator can jog the head in rapid forward, coarse feed, fine feed, or rapid traverse by depressing the desired manual control push buttons 69, 67, 70, or 64. When none of these push buttons is depressed, a series circuit, including all of these push buttons in their upper (Fig. 19) positions, and a conductor 324, is completed to energize the stop solenoid 119. Since this is the normal condition of these four push buttons, the stop solenoid 119 will normally be energized whenever the switch 68 is moved to manual control position. The directional valve 226 is therefore maintained in stop position.

When, for example, the operator depresses the forward push button 69, a circuit from conductor 316 to line L1 is completed through a conductor 326 and forward solenoid 115. This solenoid, through energization of its pilot valve associated with the positioning motor 132, will operate through the servo valve mechanism 136 to move the directional valve 226 to "forward" position. The head will continue in rapid forward traverse as long as the push button 69 is held depressed. When this push button is released, the circuit through the stop solenoid 119 is immediately completed, this resulting in the shifting of the directional valve 226 from its rapid "forward" to its "stop" position. The depression of the push buttons 67, 70, and 64 will, in a similar manner, cause the energization of the coarse feed solenoid 116, the fine feed solenoid 117, and the reverse solenoid 118, respectively, to cause corresponding movement of the head.

For automatic operation of the head, the selector switch 68 is moved to automatic (full line) position, thus opening switch 314 to disconnect conductor 316 from line L3 and closing switch 315 to connect conductor 328 to the line L3, the supply of current to the conductor 328 being effective to energize the automatic control circuits. When the switch 68 is thus shifted to automatic position, the control relay CR2 is deenergized, thus permitting switches 318 to 323 to close.

To be in condition for an automatic cycle of operation, the head must be in its uppermost position, in which position it closes a limit switch LSB. Thus a circuit is completed from the conductor 328 through the limit switch LSB, forward push button 63 (in its upper position, Fig. 19), conductor 330, switch 319, conductor 332, and stop solenoid 119, to the line L1. A circuit in parallel with the solenoid 119 is also completed from the switch 319, through switch 318, and a control relay CR1Y to the line L1. The relay CR1Y operates to release a mechanical latch which operates in conjunction with a relay CR1X to hold the switches of the latter in operated position after the relay CR1X is deenergized.

To initiate the automatic cycle, the operator presses the forward push button 63 which opens the previously described circuits through the stop solenoid 119 and the release relay CR1Y, and completes a circuit from the conductor 328, through limit switch LSB, conductor 334, and switch 335, to energize the forward solenoid 115. The directional valve 226 is thus shifted to its forward position and the head commences moving downwardly, thereby opening limit switch LSB and deenergizing forward solenoid 115.

In a normal setup, the head will thus continue traversing rapidly forward (downward) to a point just prior to which the tools enter the work. At this point, one of the dogs 56 operates a coarse feed limit switch LS1 which completes a circuit from conductor 328 through switch 322, switch LS1, normally closed limit switch LS2, normally closed switch 336 of relay CR1X, and the winding of coarse feed solenoid 116 to the line L1. The directional valve 226 is thereby shifted to coarse feed position, and the discharge of oil from the lower end of cylinder 48 is fed through passageway 278, through the governor valve 144 (Fig. 11), passageway 292, through the coarse feed aperture valve 146, passageways 296 and 296.1, to the annulus 296.2 (Fig. 18), and thence around the directional valve 226 to the sump. The head will therefore continue to descend at a speed controlled by the setting of the coarse feed adjustable aperture valve 146 until another one of the dogs 56 operates the fine feed limit switch LS2.

Operation of the limit switch LS2 will open the previously described energizing circuit for the coarse feed solenoid 116 and complete a circuit from conductor 328, through switch 321, switch LS2, a normally closed switch 337, through the winding of solenoid 117, to the line L1. Through the operation of the positioning motor and servo valve, the directional valve 226 will thereby be positioned for fine feed, in which position the annular groove 296.2 is covered by a land of the directional valve so that the oil after passing through the coarse feed aperture valve 146 is constrained to flow through the passageway 96, and through the fine feed adjustable aperture valve 148, from which it is discharged to the sump through passageway 300S.

In some cases, the dogs for the limit switches LS1 and LS2 are positioned close together, and it may happen that switches LS1 and LS2 are closed at nearly the same time, and that switch LS1 is not opened before limit switch LS2 is closed. It is for this reason that limit switch LS1 in operated position, and limit switch LS2 in unoperated position, are in series, and thereby prevent the energization of the fine feed solenoid 117 before the deenergization of the coarse feed solenoid 116.

The directional valve 226 will remain in fine feed position until the tools have completed their operations in the work. At this point, a reverse dog 56 carried by the dog bracket 41, operates limit switch LS—RR to condition the machine for rapid reverse traverse. The switch LS—RR upon closure completes a circuit from conductor 328 through switch 323, switch LS—RR, conductor 342, and control relay CR1X to line L1. The relay CR1X is, as previously stated, a mechanically locked relay which, upon being thus energized, is held in locked position until relay CR1Y is energized. Energization of relay CR1X opens switches 335, 336, and 337, and closes switch 338.

Closure of switch 338 completes a circuit from the conductor 328, through switches 320 and 338, through reverse solenoid winding 118, to line L1. Energization of the reverse solenoid 118 results, through operation of the positioning motor and servo valve mechanism, in positioning the directional valve 226 to rapid reverse traverse position (the directional valve being in its leftmost position, Fig. 18), in which position oil from the high pressure pump 78 is supplied through conduit 256.2 (supplemented by oil passing the check valve 272 from the low pressure pump) to annular groove 256.3 and around the reduced diameter portion of the directional valve to annular groove 278.2, and through conduit 278.1, to the lower end of the actuating cylinder 48. The head is thus moved upwardly at a rapid rate.

Energization of the relay CR1X, by its opening of the switches 335, 336, and 337, opens the circuits through which the solenoids 115, 116, and 117, respectively, might be energized, so that upon rapid reverse traverse, closure of the various limit switches by their dogs 56 will not result in spurious energization of these solenoids. Upon reverse traverse movement of the head, the limit switch LS—RR opens, but the switches of relay CR1X are held in mechanically locked position by the control relay CR1Y.

The head continues rapid reverse traverse, until it reaches its back position, at which time one of the dogs 56 will operate to close limit switch LSB. Closure of this switch energizes CR1Y through the following circuit: from conductor 328, switch LSB, forward push button switch 63, conductor 330, switches 319 and 318, the winding of relay CR1Y, and thence to the line L1. The switches operated by relay CR1X are thereby released, and are returned to the position in which they are shown in Fig. 19. The resultant opening of the switch 338 deenergizes the reverse solenoid 118. Closure of limit switch LSB also energizes the stop solenoid through the circuit traced as follows: from conductor 328, switch LSB, forward push button switch 63, conductor 330, switch 319, conductor 332, and winding of stop solenoid 119, to line L1. Energization of the solenoid 119 causes the directional valve to move to its stop position, and the head therefore comes to rest at the back position, thus completing an automatic cycle of operation.

If, due to tool breakage, or other reason, the operator wishes to interrupt an automatic cycle, this can be accomplished at any time during the cycle by depressing the automatic reverse push button 66. Operation of this push button completes a circuit from conductor 328, through the reverse push button switch 66, conductor 342, and control relay CR1X to the line L1. The relay CR1X is then mechanically locked in operated position, and closure of the switch 338 results in energization of the reverse solenoid 118 to cause a rapid reverse traverse, the opening of switches 335, 336, and 337 breaking any circuit which may have been completed to one of the solenoids 115, 116, and 117. The head will thus return to its uppermost position closing limit switch LSB, which completes a circuit to the stop solenoid 119, and all of the electrical and hydraulic controls will then be in their normal or neutral positions.

From the foregoing, it will appear that the control apparatus of our invention constitutes a simple and effective, but highly flexible means for controlling the operation of a hydraulically actuated machine tool head or similar part. The controls are so arranged that the operator may stop the automatic cycle at any stage in the event of tool breakage or similar emergency. The directional valve is so constructed and arranged that the head will be hydraulically actuated in a smooth and regular manner, since sudden changes in pressure in the lower end of the actuating cylinder 48 are avoided because it is at all times connected to the governor valve 144, which, due to its regulating function and displacement, operates as a shock absorber. The possibility of excessive stresses in the apparatus, due to suddenly changing hydraulic pressure on the actuating piston 46, is thus eliminated.

Due to the improved construction of the servo valve mechanism, the hydraulic forces acting on its parts are nicely balanced, so that the parts move freely and wear is minimized.

The arrangement of the hydraulic controls is very compact, and each of the operating parts is, nevertheless, readily accessible for inspection without the necessity of dismantling other parts.

While we have shown and described a particular embodiment of our invention, it will be apparent than numerous variations and modifications thereof may be made without departing from the underlying principles of the invention. We therefore desire, by the following claims, to include within the scope of our invention all such variations and modifications by which substantially the results of our invention may be obtained through the use of substantially the same or equivalent means.

We claim:

1. In a control apparatus for a machine tool having a reciprocable part and a piston and cylinder type hydraulic actuator therefor, the combination of a plurality of switches, adjustable means for operating said switches when said part is in predetermined positions, a hydraulic positioning motor comprising a cylinder and elongated piston valve freely reciprocable therein, said cylinder having a plurality of pairs of connected ports spaced apart substantially the same distance as the ends of the piston valve, means supplying hydraulic fluid under pressure to the opposite ends of said cylinder, a plurality of shut-off valves associated with said positioning motor and by their operation respectively venting said pairs of ports and thereby determining the position of the piston valve of said motor, electrical means controlled by said switches for operating said shutoff valves, a directional valve for controlling the admission and discharge of a hydraulic fluid to and from the opposite ends of the cylinder of said hydraulic actuator, a two-part servo valve, a driving connection between one part of said servo valve and the piston valve of said positioning motor, a driving connection between said directional valve and the other part of said servo valve, and hydraulic means for moving said directional valve under the control of said servo valve.

2. In a control apparatus for a machine tool having a reciprocatory head and a hydraulic actuating motor therefor, the combination of a plurality of limit switches, a plurality of dogs adjustably secured to said head and respectively positioned to operate said limit switches, a hydraulic positioning motor, a plurality of solenoid operated valves controlled by said limit switches and associated with said positioning motor, said positioning motor comprising a cylinder having a piston valve freely reciprocable therein, said cylinder having a plurality of pairs of connected ports spaced apart substantially the same distance as the ends of the piston valve, means supplying hydraulic fluid under pressure to the opposite ends of said cylinder, and means forming passageways respectively connected to said pairs of ports and adapted to be vented upon operation of the solenoid operated valves, respectively, a directional valve for controlling the admission and discharge of a hydraulic fluid to and from the opposite ends of said hydraulic actuator, a two-part servo valve, a driving connection between one part of said servo valve and said positioning motor, a driving connection between said directional valve and the other part of said servo valve, and hydraulic means for moving said directional valve under the control of said servo valve.

3. In an electric and hydraulic control apparatus for a machine tool having a reciprocatory part and a hydraulic reciprocatory actuating motor therefor, a directional valve controlling the operation of said hydraulic actuating motor, a hydraulic positioning motor for controlling the position of said directional valve, said positioning motor comprising a cylinder, a free piston reciprocable in said cylinder, means to supply hydraulic fluid under pressure to the opposite ends of said cylinder at a controlled rate, a plurality of pairs of ports leading from said cylinder to permit free discharge of the hydraulic fluid therefrom, each of said pair of ports being spaced lengthwise of said cylinder a distance corresponding substantially to the length of said free piston, a solenoid operated valve for each of said pairs of ports and operable to connect its pair of ports to a space of low pressure, and electrical circuit means responsive to the position of said part for controlling the energization of said solenoid operated valves.

4. A positioning motor mechanism comprising a body having a cylinder formed therein, an elongated piston reciprocable in said cylinder, a plurality of pairs of ports in said cylinder, each pair of ports being spaced longitudinally of the cylinder a distance slightly less than the length of said piston, solenoid operated valves selectively operable to open a passageway from their associated pairs of ports to a point of low pressure, and means for supplying a hydraulic fluid under pressure to the opposite ends of said cylinder at a controlled rate.

5. In a machine tool having a reciprocatory hydraulic actuating motor for operating a part thereof, a directional control valve for controlling the admission and discharge of hydraulic fluid to and from the opposite ends of said actuating motor, thereby to control the direction and rate of travel of said machine tool part, a hydraulic positioning motor, said positioning motor comprising a cylinder having a piston valve freely reciprocable therein, means supplying hydraulic fluid under pressure to the opposite ends of the cylinder, a plurality of pairs of ports in said cylinder, the ports of each pair being spaced longitudinally of the cylinder distances substantially equal to that between the end faces of the piston valve, a plurality of solenoid operated valves selectively energizable respectively to vent the pairs of ports thereby to control the position of said positioning motor, and hydraulic means controlled by said positioning motor for determining the position of said directional valve.

6. In an electro-hydraulic control system for machine tools operable in response to the position of a directional valve, means for determining the position of the directional valve comprising a hydraulic positioning motor, said positioning motor comprising a cylinder having a piston valve freely reciprocable therein, means supplying hydraulic fluid under pressure to the opposite ends of the cylinder, a plurality of pairs of ports in said cylinder, the ports of each pair being spaced longitudinally of the cylinder distances substantially equal to that between the end faces of the piston valve, solenoid operable valve means respectively effective to vent the pair of ports for determining the position of said piston valve, a servo valve comprising two relatively movable parts, means for mechanically connecting one of the servo valve parts to the piston valve of said positioning motor, means for connecting the other of said servo valve parts to said directional valve, and hydraulic circuits controlled by said servo valve to hydraulically actuate said directional valve.

7. A hydraulic control apparatus for machine tools having a reciprocatory actuating motor, a directional valve for controlling the flow of hydraulic fluid to and from said motor, said directional valve having a moving member, a two-part servo valve, one part thereof having a mechanical drive connection with the moving member of said directional valve, an electro-magnetically controlled positioning motor, said positioning motor comprising a cylinder having a piston valve freely reciprocable therein, means supplying hydraulic fluid under pressure to the opposite ends of the cylinder, a plurality of pairs of ports in said cylinder, the ports of each pair being spaced longitudinally of the cylinder distances substantially equal to that between the end faces of the piston valve, valves operable respectively to connect the pairs of ports to a space of low pressure, remote electrical means for selectively controlling the operation of the valves of said positioning motor, and a mechanical drive connection between said positioning motor and the other part of said servo valve.

8. A machine tool having a hydraulically actuated part and having hydraulic control means for determining the direction and speed of actuation of said part, and electrical means for controlling the operation of said hydraulic control means comprising, a plurality of electrically operated devices respectively operating on said hydraulic control means to condition the latter for causing said hydraulically actuated part to move at different speeds forward, to reverse, or to stop, a plurality of limit switches including a coarse feed limit switch and a fine feed limit switch, a plurality of dogs adjustably secured to said hydraulically actuated part for respectively operating said limit switches, circuits respectively completed by said limit switches to cause energization of said electrically operated devices respectively, and means to open the circuit completed by said coarse feed limit switch upon operation of said fine feed limit switch.

9. In a hydraulic positioning motor for positioning a part in any one of a plurality of predetermined positions in response to the completion of one of a plurality of electrical circuits, the combination of a member having a cylinder formed therein, means to supply hydraulic fluid under equal pressure to both ends of said cylinder, a pair of piston heads reciprocable in said cylinder, an actuator for said part rigidly connecting said pistons, said cylinder having a plurality of pairs of spaced ports, the spacing between said ports of a pair being substantially the same as the distance between the end faces of said piston heads, and a solenoid operated valve for each pair of ports, said solenoid operated valve operating to connect its associated pair of ports to a point of relatively low hydraulic pressure upon completion of the circuit through its solenoid winding.

10. The combination set forth in claim 9, in which said cylinder is provided with additional ports, one adjacent each end of the cylinder, and in which a solenoid operated valve is provided to control the escape of hydraulic fluid through each of said additional ports.

11. In a positioning motor, the combination of a body forming a cylinder, a pair of rigidly connected piston heads reciprocable in said cylinder, an actuating member connected to said piston heads, means to supply a fluid under pressure to both ends of said cylinder, said cylinder having a plurality of pairs of ports, the ports of each pair being spaced distances substantially equal to the distance between the end faces of the piston heads, and a plurality of selectively operable valves, said valves being connected respectively to control the escape of fluid from said pairs of ports.

12. A positioning motor comprising a body having a cylinder, an elongated piston valve reciprocable in said cylinder, said body having a plurality of pairs of ports spaced longitudinally of the cylinder, the ports of each pair being spaced substantially the distance between the end faces of the piston valve so that both ports of a pair may be substantially covered by the piston valve, said body having passageways connecting the ports of a pair, respectively, means for supplying hydraulic fluid under pressure to the opposite ends of the cylinder, and a plurality of valves, one located in each of said passageways, and operable upon actuation to vent its passageway and thereby cause said piston valve to be moved until it attains a position in which it covers or substantially covers the pair of ports connected to the vented passageway.

ROBERT A. SCHAFER.
RALPH B. RODAL.